United States Patent
Schafer

(10) Patent No.: US 8,028,947 B1
(45) Date of Patent: Oct. 4, 2011

(54) DEPTH FINDER RETRACTOR FOR ICE FISHING

(76) Inventor: Brent S. Schafer, Eagan, MN (US)

( * ) Notice: Subject to any disclaimer, the term of this patent is extended or adjusted under 35 U.S.C. 154(b) by 449 days.

(21) Appl. No.: 11/623,178

(22) Filed: Jan. 15, 2007

Related U.S. Application Data

(60) Provisional application No. 60/761,481, filed on Jan. 24, 2006.

(51) Int. Cl.
*A01K 89/01* (2006.01)

(52) U.S. Cl. ............ 242/251; 242/385; 242/375.1; 43/21

(58) Field of Classification Search .......... 242/225–229, 242/322, 250–260, 422, 385, 375.1, 375.2; 43/21
See application file for complete search history.

(56) References Cited

U.S. PATENT DOCUMENTS

| | | | | |
|---|---|---|---|---|
| 2,896,354 A | * | 7/1959 | Reed et al. | 43/21 |
| 2,910,252 A | * | 10/1959 | Joy | 242/226 |
| 3,246,859 A | * | 4/1966 | Martin | 242/250 |
| 3,784,125 A | * | 1/1974 | Law et al. | 242/387 |
| 4,856,224 A | * | 8/1989 | Fincher, Sr. | 43/43.12 |
| 4,979,153 A | * | 12/1990 | Terry | 367/93 |
| 5,040,323 A | * | 8/1991 | Hughes, Jr. | 43/18.1 R |
| 5,101,591 A | * | 4/1992 | Frazier et al. | 43/17 |
| 5,131,165 A | * | 7/1992 | Benson | 33/719 |
| 5,253,220 A | * | 10/1993 | Wilson, Sr. | 367/107 |
| 5,351,538 A | * | 10/1994 | McGuire et al. | 73/301 |
| 5,495,689 A | * | 3/1996 | Cassem | 43/17.1 |
| 5,887,376 A | * | 3/1999 | Currier et al. | 43/17 |
| 6,262,761 B1 | * | 7/2001 | Zernov et al. | 348/81 |
| 6,305,120 B1 | * | 10/2001 | Boys | 43/43.12 |
| 6,421,948 B1 | * | 7/2002 | Craig | 43/17 |
| 6,476,853 B1 | * | 11/2002 | Zernov et al. | 348/81 |
| 6,666,252 B2 | * | 12/2003 | Welfonder | 160/296 |
| 6,843,302 B2 | * | 1/2005 | Nijs | 160/321 |
| 6,938,367 B2 | * | 9/2005 | Cameron et al. | 43/17 |
| 6,969,287 B1 | * | 11/2005 | Motsenbocker | 440/1 |
| 7,198,219 B1 | * | 4/2007 | Alajajyan et al. | 242/247 |
| 7,335,071 B1 | * | 2/2008 | Motsenbocker | 440/1 |
| 2007/0181729 A1 | * | 8/2007 | Schuster | 242/322 |

* cited by examiner

*Primary Examiner* — Emmanuel M Marcelo
(74) *Attorney, Agent, or Firm* — Dicke, Billig & Czaja PLLC

(57) ABSTRACT

An embodiment of the invention comprises a retractor for use with a depth finder unit. The retractor includes a depth probe on a length of cord, a winding mechanism, a ratcheting slip ring assembly, and a housing.

8 Claims, 10 Drawing Sheets

DEPTH FINDER RETRACTOR FOR ICE FISHING

REFERENCE TO RELATED APPLICATION

This application claims priority to U.S. Applic. No. 60/761,481, filed Jan. 24, 2006, the content of which is incorporated herein by reference.

FIELD OF THE INVENTION

The present invention relates generally to ice fishing. More specifically, the present invention is a refractor for a depth finder.

BACKGROUND OF THE INVENTION

While ice fishing, it is often desirable to utilize a depth finder to assist in identifying the presence of fish. A typical depth finder includes a depth probe on a cord that is lowered through the fishing hole cut in the ice.

Upon receiving a fish hit on the hook, an angler will desire to remove the depth probe so that it will not interfere with completing the catch and bringing in the fish. Time is often a premium when the angler is attempting to secure the fish, and the depth probe cord is hurriedly pulled up by the angler. The result is that the depth probe cord will be strewn about the area around the fishing hole, and the angler wastes time pulling up the probe.

A need exists, therefore, for a depth finder retractor for ice fishing that quickly and neatly pulls the depth finder up out of the water and out of the way of the fishing line.

SUMMARY OF THE INVENTION

The present invention comprises a fish finder probe retractor for use with a fish or depth finder unit. The fish finder probe refractor includes a probe, a spool and a retraction mechanism. The probe has a cable extending therefrom. The cable operably connects the probe to the fish or depth finder.

The spool is rotatably mounted in the retractor. The spool is adapted to receive the cable for winding there around. The refraction mechanism controls rotation of the spool.

BRIEF DESCRIPTION OF THE DRAWINGS

The present invention can be more completely understood and appreciated by referring to the following more detailed description of the presently preferred exemplary embodiments of the invention in conjunction with the accompanying drawings, of which.

DETAILED DESCRIPTION OF THE DRAWINGS

Figure 1:
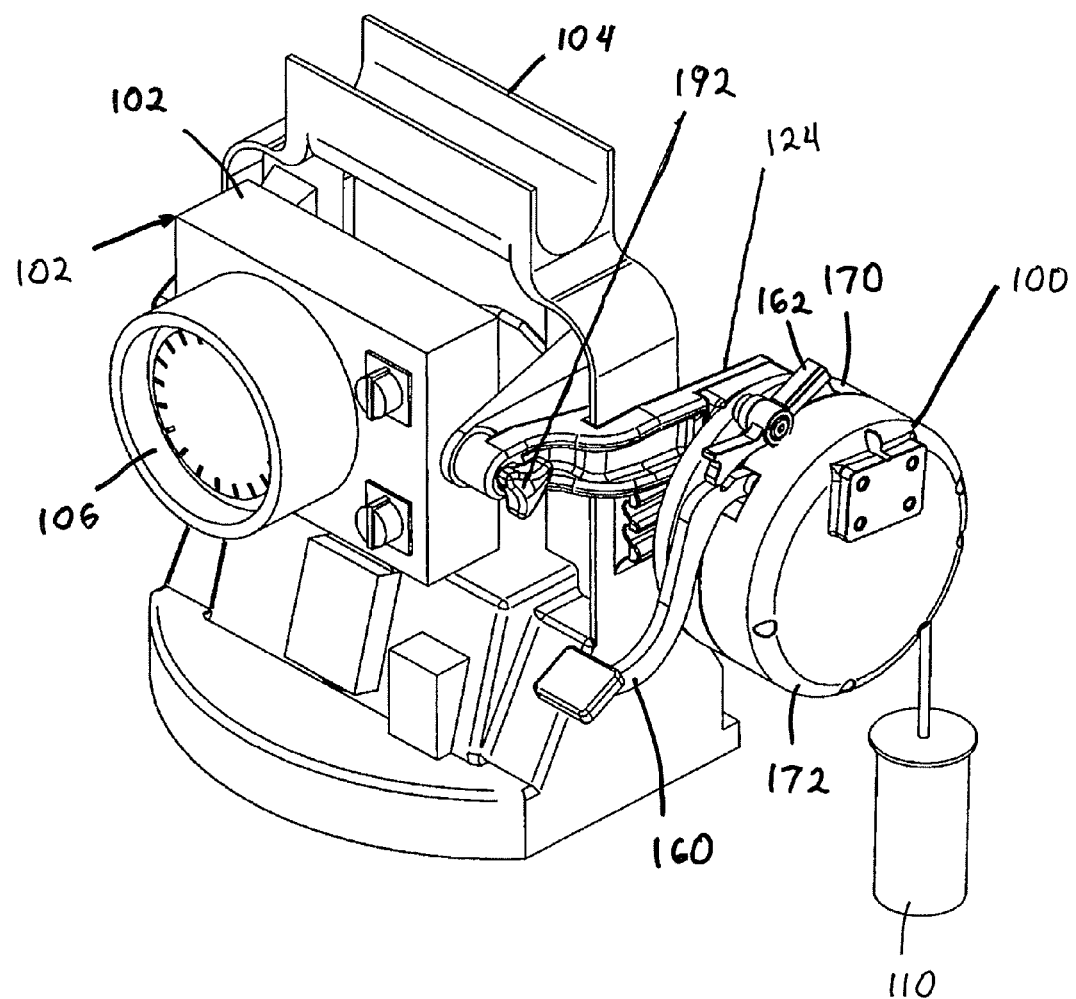
FIG. 1 is a perspective view of a retractor according to an embodiment of invention coupled to a fish finder unit.
Figure 2:
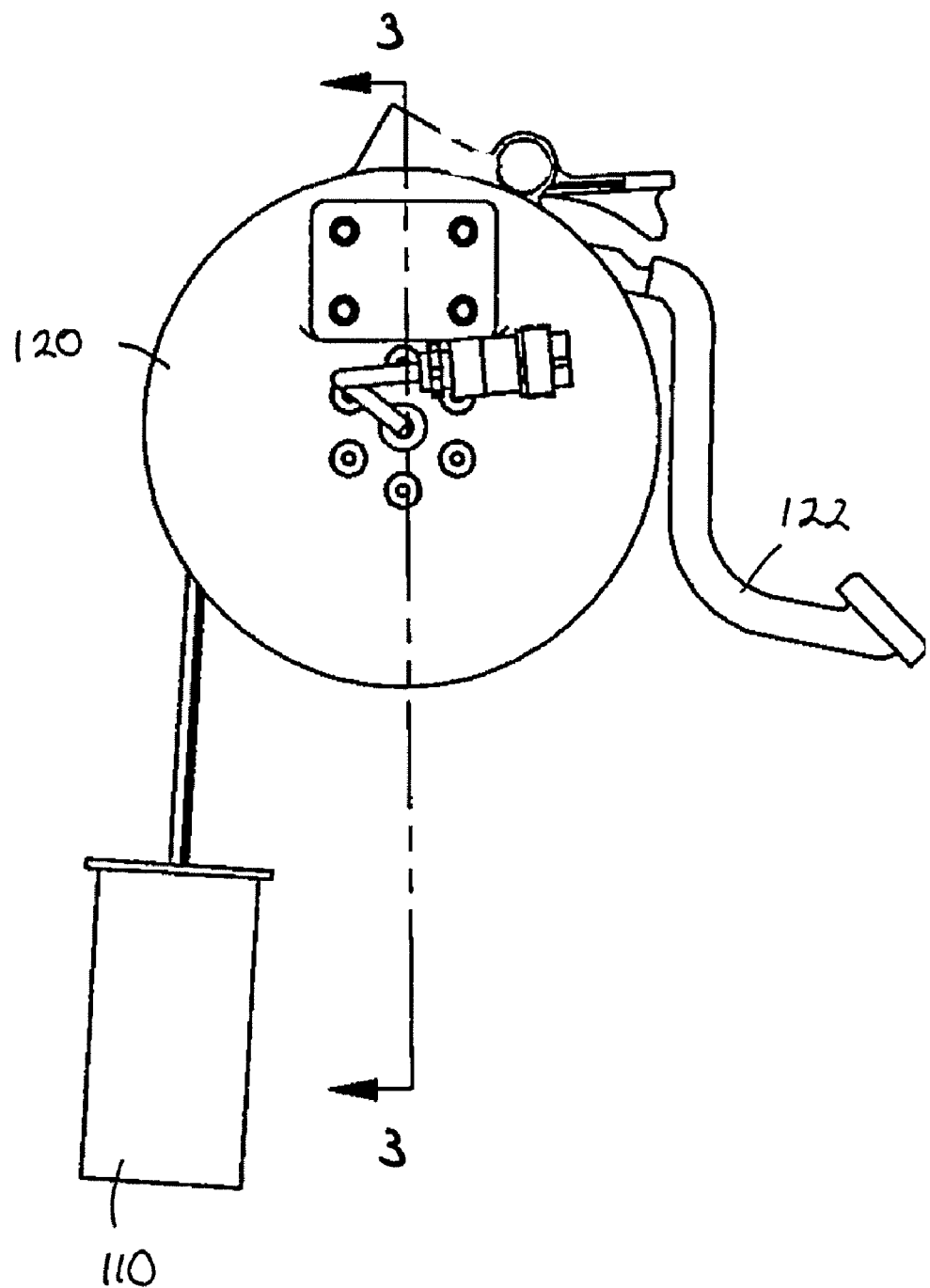
FIG. 2 is a back view of the retractor.
Figure 3:
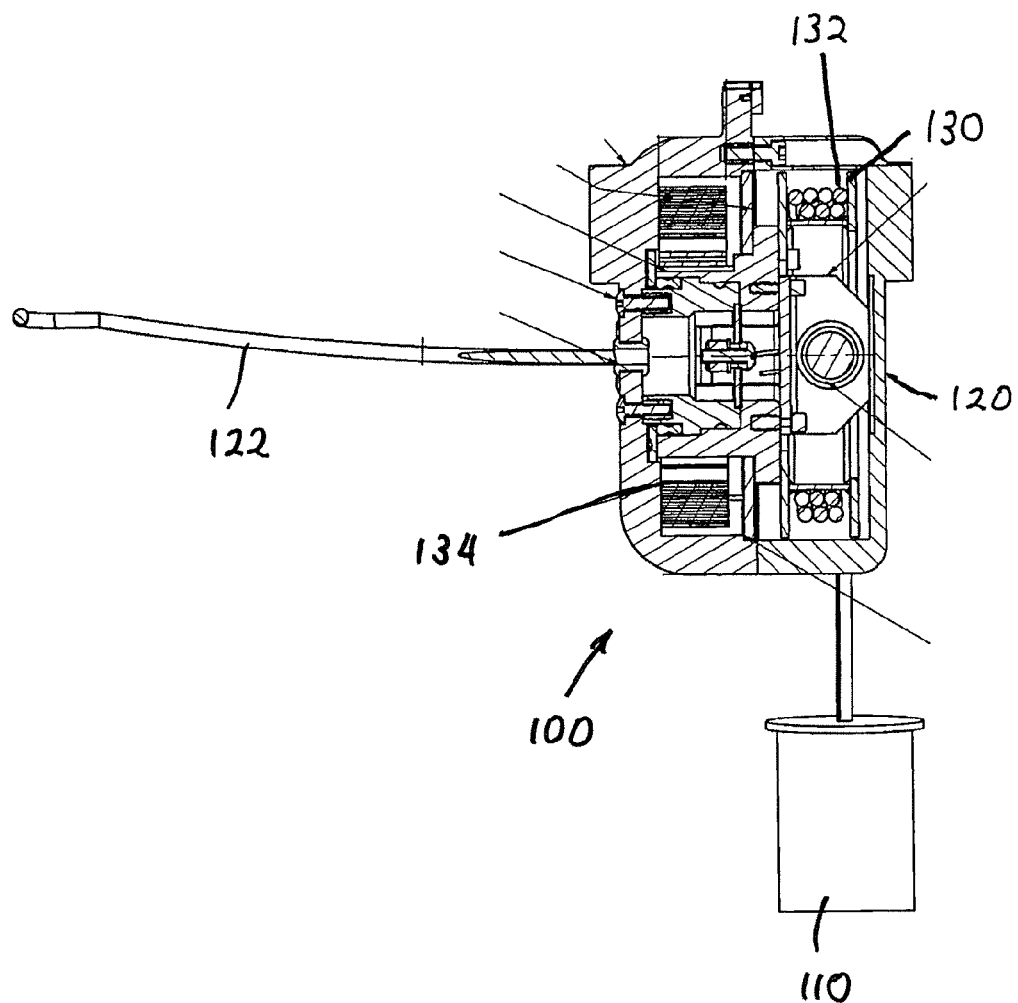
FIG. 3 is a sectional view of the retractor take along a line 3-3 in FIG. 2.
Figure 4:
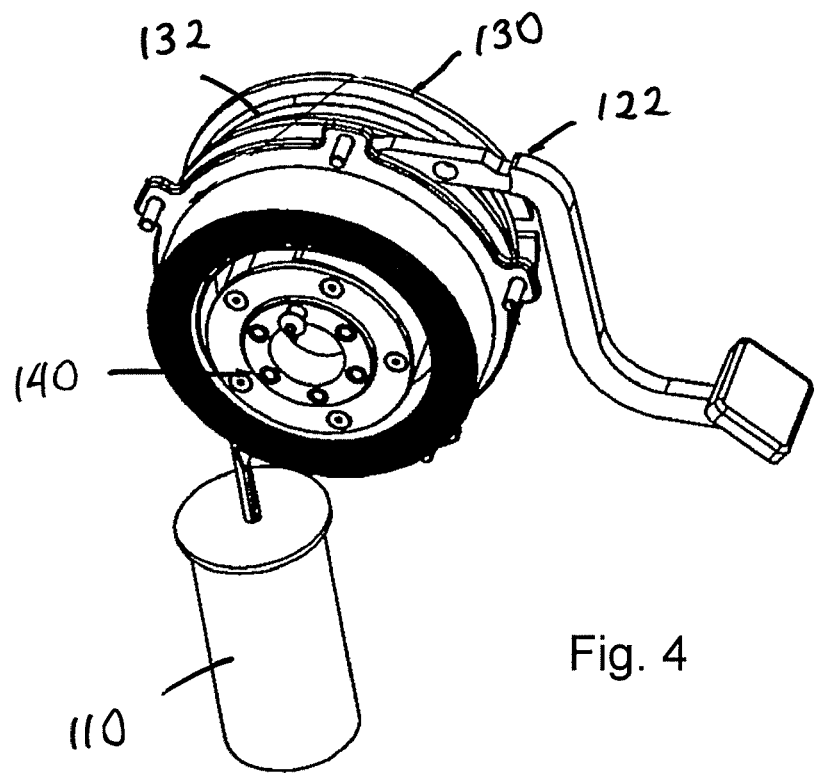
FIG. 4 is a front perspective view of the retractor with front and back covers removed.
Figure 5:
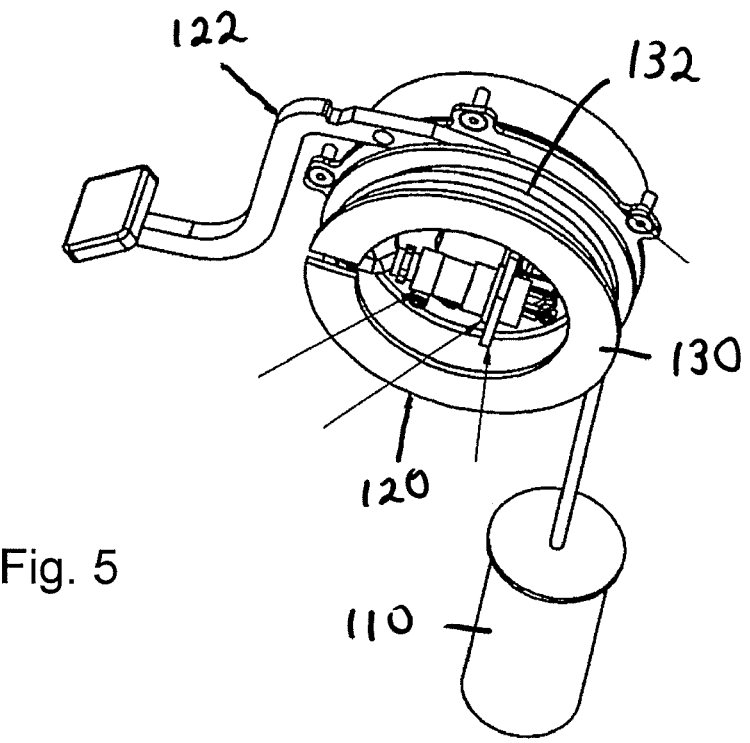
FIG. 5 is a back perspective view of the retractor with the front and back covers removed.
Figure 6:
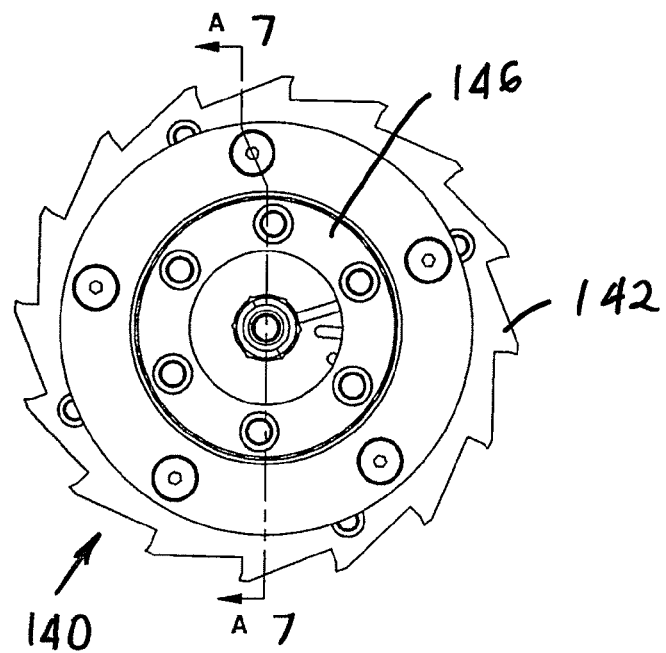
FIG. 6 is a front view of a slip ring assembly taken along a line 7-7 in FIG. 6.
Figure 7:
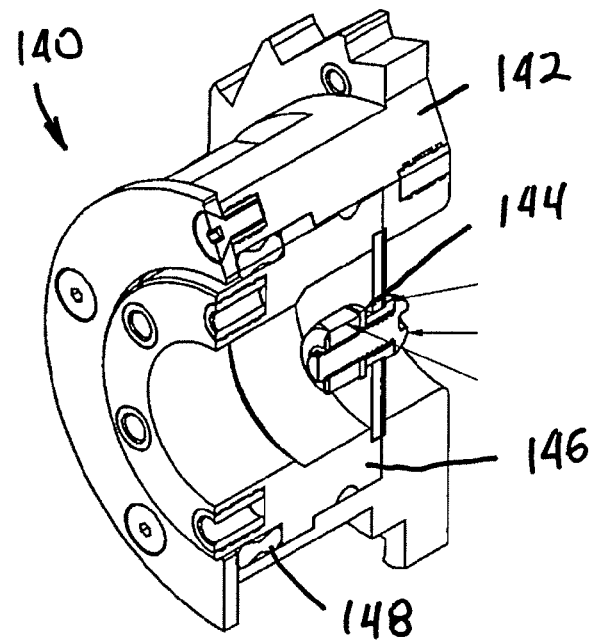
FIG. 7 is a sectional view of the slip ring assembly.
Figure 8:
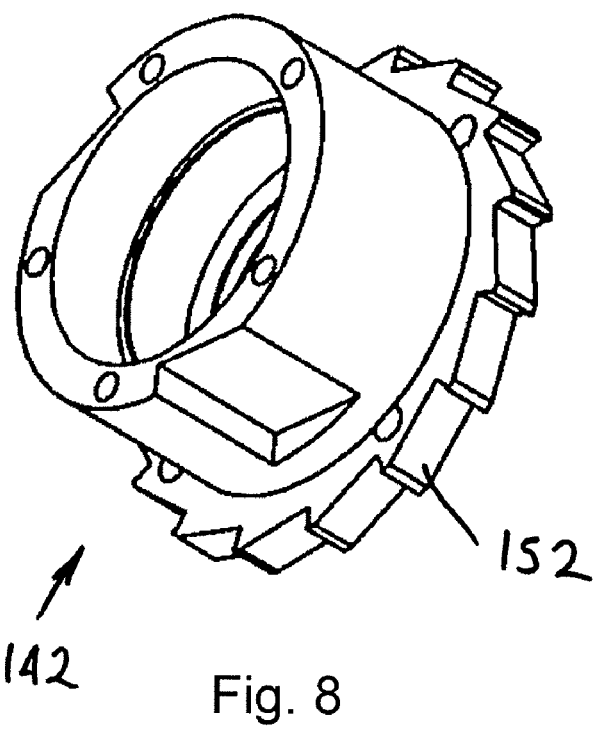
FIG. 8 is a perspective view of slip ring holder ratchet for use in the slip ring assembly.
Figure 9:
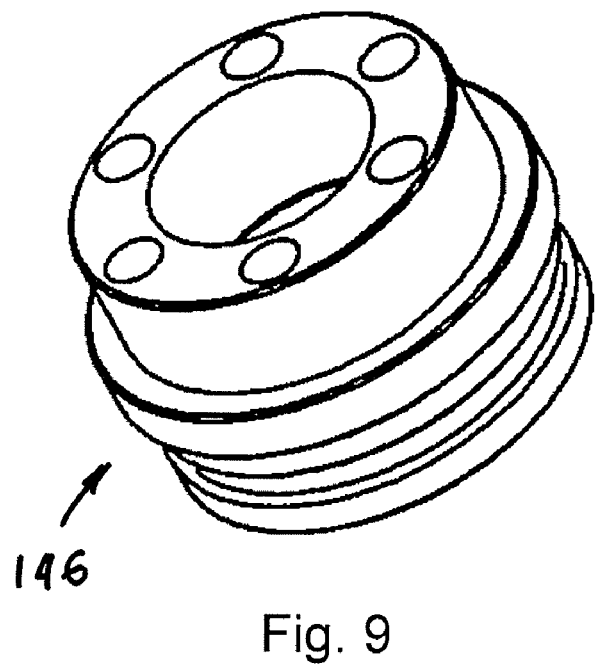
FIG. 9 is a perspective view of a slip ring bushing holder for use in the slip ring assembly.
Figure 10:
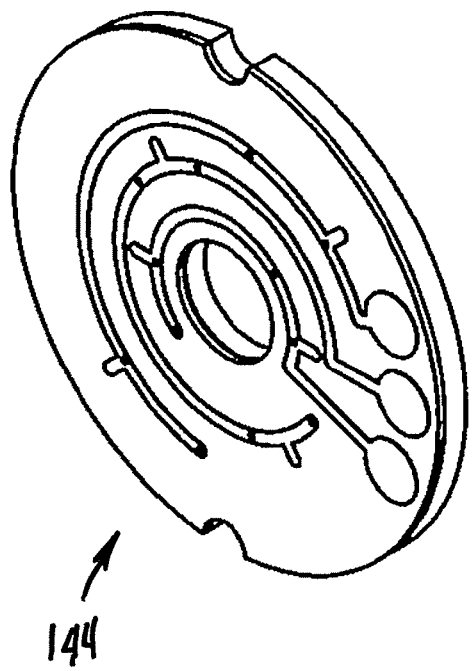
FIG. 10 is a front perspective view of a slip ring for use in the slip ring assembly.
Figure 11:
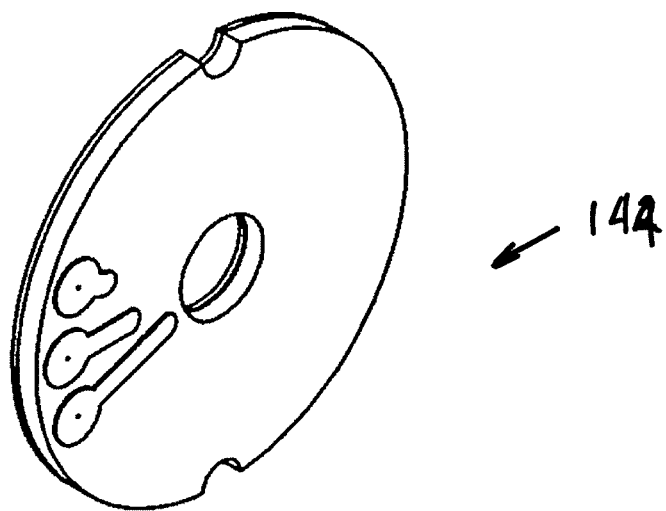
FIG. 11 is a back perspective view of the slip ring.

In the following detailed description of the present invention, numerous specific details are set forth in order to provide a thorough understanding of the present invention. However, it will be obvious to one skilled in the art that the present invention may be practiced without these specific details. In other instances, well-known methods, procedures, and components have not been described in detail so as to not unnecessarily obscure aspects of the present invention.

An embodiment of the invention relates to a retractor 100 for use in conjunction with a depth finder or fish finder 102, as illustrated in the figures. A typical fish finder 102 includes a base 104, a processing unit 106, and a display 108 for communicating a depth to an angler.

The retractor 100 enables a probe 110 to be retrieved so that the probe 110 does not interfere with reeling in a fish. Alternatively, the refractor 100 may be used with other devices such as an underwater video camera.

The retractor 100 has the following main components—a reel 120, an activation paw 122, a mounting bracket 124 and the probe 110, as illustrated in FIGS. 2-5. The reel 120 includes a spool 130 over which a cable 132 extending from the probe 110 is wound. The width and depth of the spool 130 are selected based upon the size and length of the cable 132 that is intended to be used in the retractor 100.

Extending and retracting the probe 110 may be accomplished using a variety of mechanism. In one embodiment of the invention, the probe 110 is extended from the retractor 100 using manual force and the probe 110 is retracted using a spring mechanism 134. When the probe 110 is extended, the spring 134 winds up so that when it is desired to retract the probe 110, the force of the spring 134 causes the spool 130 to rotate and thereby wrap the cable 132 around the spool 130. It is also possible for the extension and retraction of the probe 110 to be accomplished using a motor (not shown).

Adjacent the spool 130 is a slip ring assembly 140 and its component parts, as most clearly illustrated in FIGS. 3 and 6-11. The slip ring assembly 140 facilitates transfer of electrical signals from the probe 110 to the fish finder 102. The slip ring assembly 140 may include a ratcheting slip ring holder 142, a slip ring 144, a bushing 146, and a spacer 148. Ratcheting slip ring holder 142 includes a plurality of teeth 152, for interacting with the paw mechanism 122.

Figure 12:
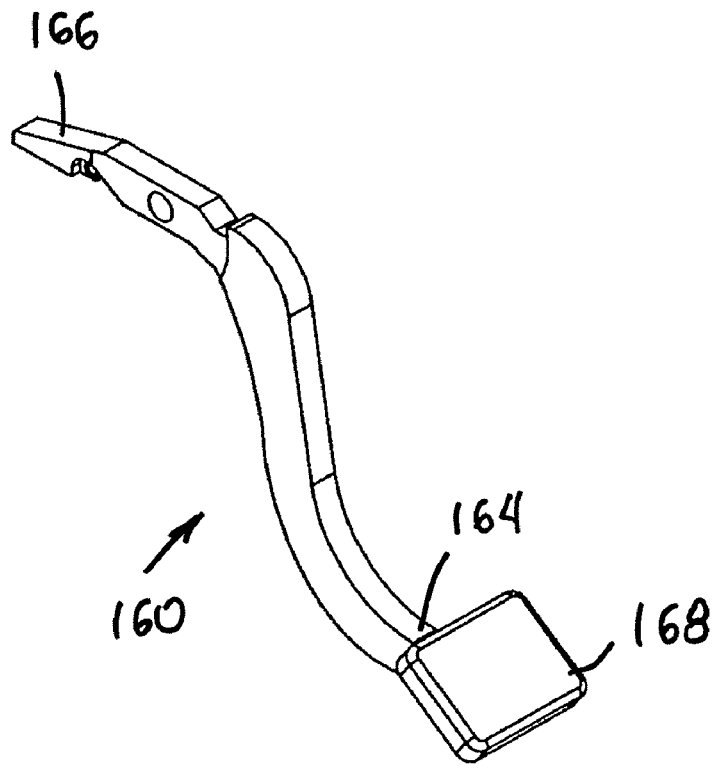
FIG. 12 is a perspective view of a paw for the refractor.
Figure 13:
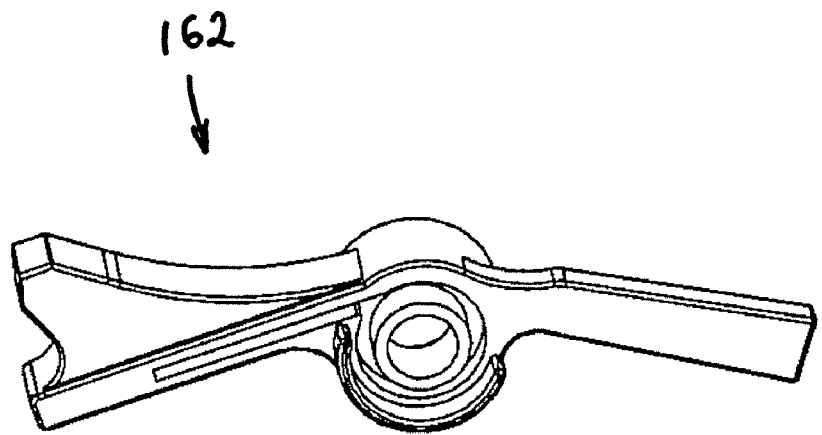
FIG. 13 is a perspective view of a lock out ratchet for the retractor.

The paw mechanism 122 includes a paw 160 and a lock out ratchet 162, as most clearly illustrated in FIGS. 1, 12 and 13. The paw 160 has a first end 164 and a second 166 and is pivotally mounted to the retractor 100 intermediate the first and second ends 164, 166. The first end 164 may include an activation surface 168 that is wider than the paw 160. The second end 166 engages the ratcheting slip ring holder 142 to thereby prevent the spool 130 from rotating. When the activation surface 168 is pressed, the paw 160 pivots so that the second end 166 does not engage the ratcheting slip ring holder 142, which enables the spool 130 to rotate in response to the force from the spring 134.

The lock out ratchet 162 is pivotally mounted to the retractor 100. When the lock out ratchet 162 is in the activated position, the paw 160 is prevented from being inadvertently pivoted.

Figure 14:
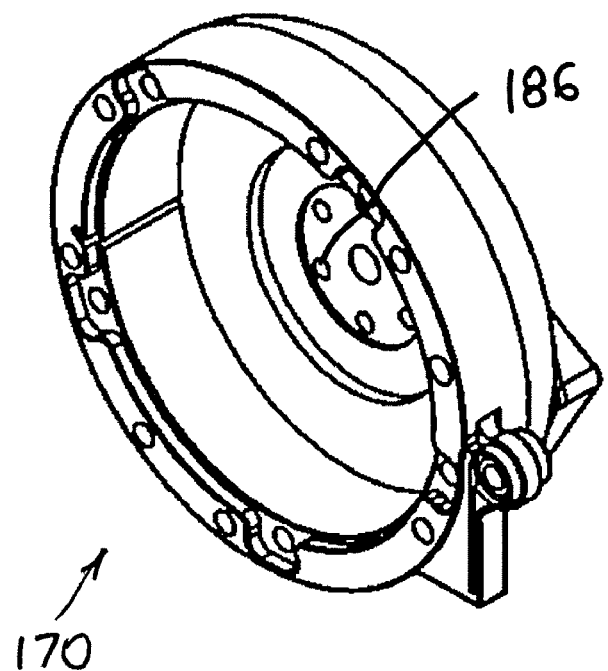
FIG. 14 is a perspective view of a back cover for the retractor.
Figure 15:
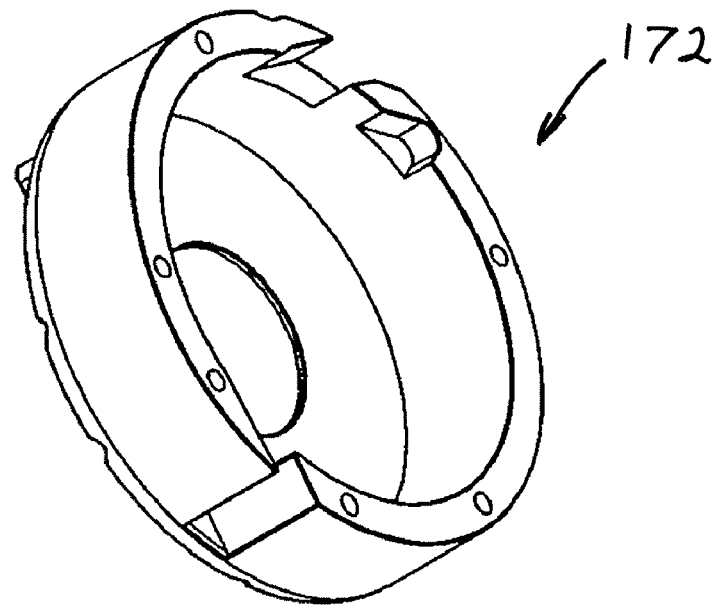
FIG. 15 is a perspective view of a front cover for the retractor.

To enhance the durability of the retractor 100, the components of the retractor 100 may be encased in a cover, as illustrated in FIG. 1. As most clearly illustrated in FIGS. 14 and 15, the cover includes a back cover section 170 and a front cover section 172. The back cover section 170 and the front cover section 172 may be removably attached to each other using a plurality of screws (not shown).

Figure 16:
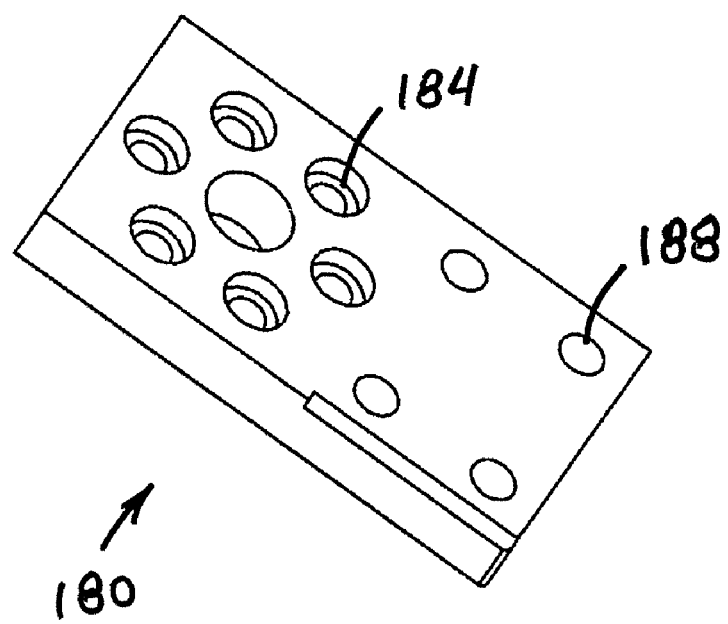
FIG. 16 is a perspective view of retractor mounting block.
Figure 17:
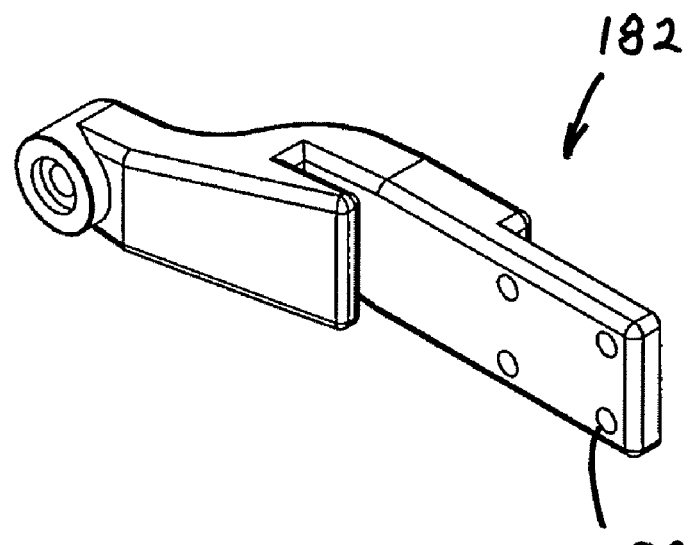
FIG. 17 is a perspective view of a refractor mounting bracket.

To facilitate attachment of the retractor 100 to the fish finder 102, the mounting bracket 124 includes components that may be configured in a variety of ways so that the refractor 100 can be used in conjunction with a variety of different fish finders 102. In one configuration, the mounting bracket 124 includes a mounting plate 180 and a mounting adapter 182, as most clearly illustrated in FIGS. 16 and 17.

While not shown, the mounting plate 180 attaches to the back cover 170 using first screw holes 184 on the mounting plate 180 and screw holes 186 on the back cover 170. The mounting plate 180 and the mounting adapter 182 are then attached to each other by extending screws (not shown) through second screw holes 188 on the mounting plate 180 and screw hole 190 on the mounting adapter 182.

The mounting adapter 182 is attached to the fish finder 102 using one of the mounting bolts 192 on the fish finder 102. To enhance the stability of the retractor 100, a slot 192 is provided in the mounting adapter 182. When the mounting adapter 182 is attached to the fish finder 102, a portion of an arm on the fish finder 102 extends into the slot 192, as illustrated in FIG. 1.

In operation, an angler pulls down on cable 132 until probe 110 is at the desired depth. Cable spool 130 and slip ring assembly 140 rotate, creating tension in spring 134. The interaction between paw mechanism 122 and teeth prevent spring 134 from retracting cable 132. When the angler wishes to retract the probe 110, he or she pushes down on paw 160, which disengages paw 160 from teeth, allowing spring 134 to recoil and thereby retract cable 132.

Details of the present invention may be modified in numerous ways without departing from the spirit or scope of the present invention. Various components of the present invention may be altered in shape or size without affecting the functionality of the device.

Although the present invention has been described with reference to particular embodiments, one skilled in the art will recognize that changes may be made in form and detail without departing from the spirit and scope of the invention. Therefore, the illustrated embodiments should be considered in all respects as illustrative and not restrictive.

The invention claimed is:

1. A fish finder probe refractor for use with a fish or depth finder comprising:
    a reel comprising:
        a fish finder probe having a cable extending therefrom, wherein the cable operably connects the fish finder probe to the fish or depth finder;
        a spool rotatably mounted in the reel, wherein the spool is adapted to receive the cable for winding there around;
        a retraction mechanism that controls rotation of the spool with respect to the reel, wherein the retraction mechanism is a spring mechanism, a motor or combination thereof; and
        an activation mechanism that controls activation of the refraction mechanism, wherein the activation mechanism comprises:
        a paw pivotally attached to the reel; and
        a ratchet mechanism operably attached to the spool, wherein the paw selectively engages the ratchet mechanism; and
    a mounting bracket for attaching the reel with respect to the fish or depth finder.

2. The fish finder probe retractor of claim 1, wherein the cable provides an electrical connection between the fish finder probe and a fish or depth finder.

3. The fish finder probe retractor of claim 1, and further comprising a lock out mechanism pivotally mounted to the retractor, wherein the lock out mechanism is pivotable between an engaged position and a disengaged position, and wherein the lock out mechanism prevents the paw from pivoting when in the engaged position.

4. The fish finder probe retractor of claim 1, and further comprising a slip ring mechanism for operably connecting the fish finder probe to the fish or depth finder.

5. A fish finder system for enhancing the performance while fishing by identifying fish, identifying underwater terrain or combination thereof, the system comprising:
    a fish or depth finder; and
    a fish finder probe refractor comprising:
        a reel comprising:
            a fish finder probe having a cable extending therefrom, wherein the cable operably connects the fish finder probe to the fish or depth finder;
            a spool rotatably mounted in the reel, wherein the spool is adapted to receive the cable for winding there around;
            a refraction mechanism that controls rotation of the spool with respect to the reel, wherein the retraction mechanism is a spring mechanism, a motor or combination thereof; and
            an activation mechanism that controls activation of the refraction mechanism, wherein the activation mechanism comprises:
            a paw pivotally attached to the reel; and
            a ratchet mechanism operably attached to the spool, wherein the paw selectively engages the ratchet mechanism; and
        a mounting bracket for attaching the refractor to the fish or depth finder.

6. The fish finder system of claim 5, wherein the cable provides an electrical connection between the fish finder probe and the fish or depth finder.

7. The fish finder system of claim 5, and further comprising a lock out mechanism pivotally mounted to the retractor, wherein the lock out mechanism is pivotable between an engaged position and a disengaged position, and wherein the lock out mechanism prevents the paw from pivoting when in the engaged position.

8. The fish finder system of claim 5, and further comprising a slip ring mechanism for operably connecting the fish finder probe to the fish or depth finder.

* * * * *